United States Patent [19]

Murayama

[11] 4,251,862
[45] Feb. 17, 1981

[54] CONTROL STORE ORGANIZATION IN A MICROPROGRAMMED DATA PROCESSING SYSTEM

[75] Inventor: Masaki Murayama, Kawasaki, Japan

[73] Assignee: Tokyo Shibaura Electric Co., Ltd., Japan

[21] Appl. No.: 116,567

[22] Filed: Jan. 29, 1980

Related U.S. Application Data

[63] Continuation of Ser. No. 874,063, Jan. 31, 1978, abandoned.

[30] Foreign Application Priority Data

Jan. 31, 1977 [JP] Japan .................................. 52/9374

[51] Int. Cl.³ .......................... G06F 13/00; G06F 9/30
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,766,532 | 10/1973 | Liebel, Jr. ................... | 364/200 |
| 3,786,434 | 1/1974 | Frye et al. ..................... | 364/200 |
| 3,800,293 | 3/1974 | Enger et al. .................. | 364/200 |
| 3,859,636 | 1/1975 | Cook ............................. | 364/200 |
| 3,859,705 | 10/1975 | Davis et al. ................... | 364/200 |
| 3,953,833 | 4/1976 | Shapiro ......................... | 364/200 |
| 3,997,895 | 12/1976 | Cassonnet et al. ............ | 364/200 |
| 4,038,643 | 7/1977 | Kim ............................... | 364/200 |
| 4,070,703 | 1/1978 | Negi .............................. | 364/200 |
| 4,085,439 | 4/1978 | Minnick ........................ | 364/200 |

Primary Examiner—Gareth D. Shaw
Assistant Examiner—Eddie Chan
Attorney, Agent, or Firm—Finnegan, Henderson, Farabow, Garrett & Dunner

[57] ABSTRACT

A microprogram control system comprising first and second control memories each supplied with microinstructions. The microprogram control system usually executes a microinstruction of a prescribed bit length read out of the first control memory. The first control memory contains data instructing the use of the second control memory. When the first control memory sends forth data instructing the use of the second control memory, a composite microinstruction of larger bit length is executed. The composite microinstruction is formed of a microinstruction read out of the first control memory and a microinstruction read out of the second control memory.

5 Claims, 5 Drawing Figures

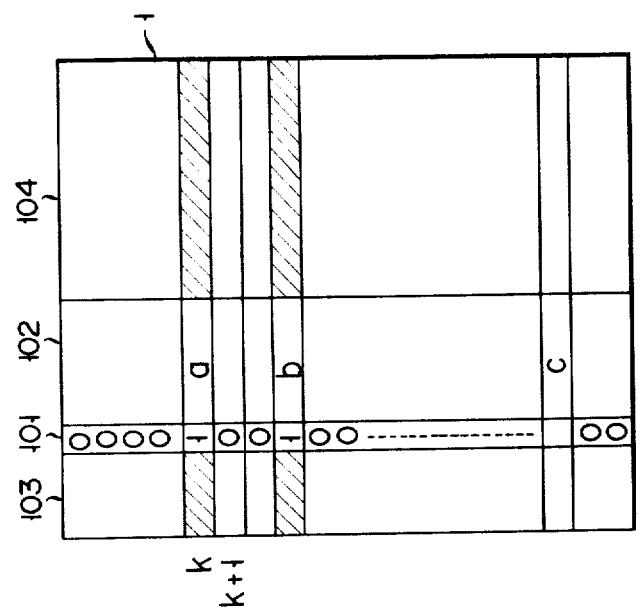
F I G. 2A
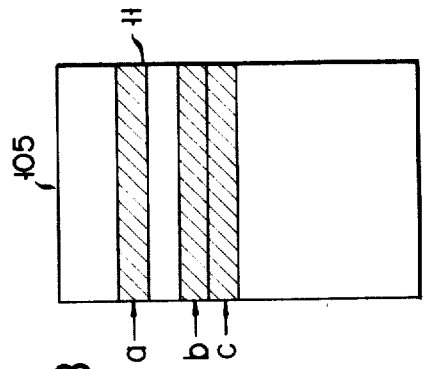
F I G. 2B
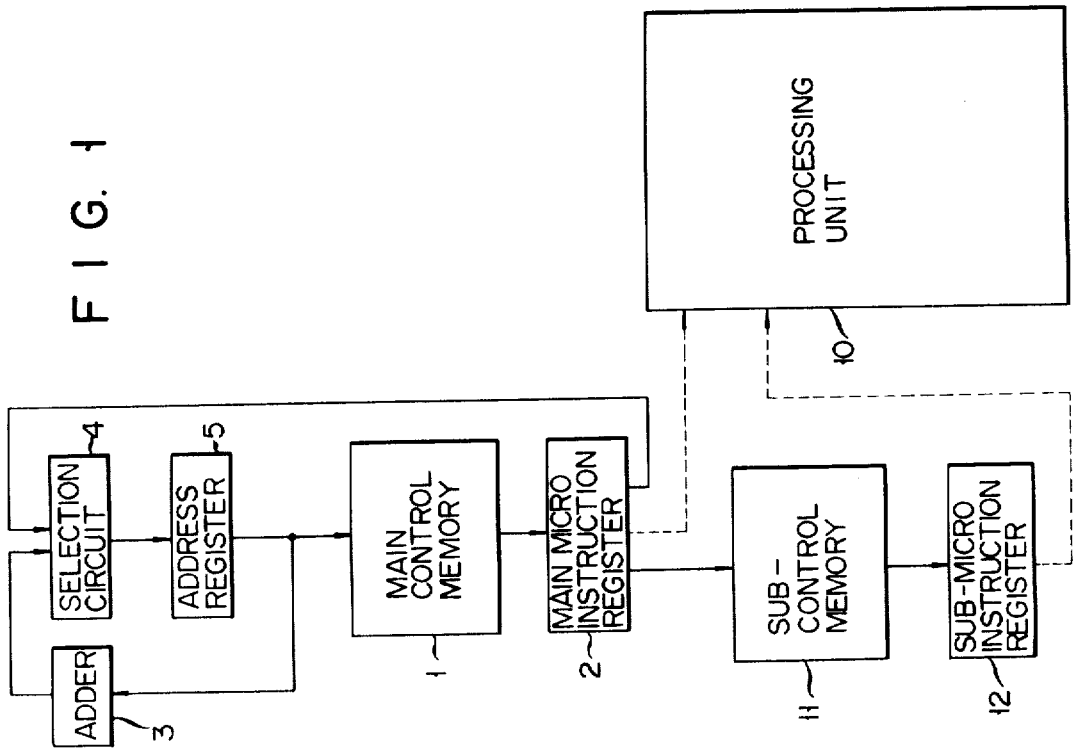
F I G. 1

CONTROL STORE ORGANIZATION IN A MICROPROGRAMMED DATA PROCESSING SYSTEM

This is a continuation of application Ser. No. 874,063, filed Jan 31, 1978, now abandoned.

BACKGROUND OF THE INVENTION

This invention relates to an improved microprogram control system for a data-processing device. A data-processing device adopting a stored program system carries out the prescribed processing of data by repeating a series of steps comprised of reading out an instruction, decoding the instruction thus read out and executing the instruction.

These steps are divided into some fundamental microsteps. These microsteps are individually referred to as micro-instructions. A data-processing device adopting a microprogram control system executes various instructions formed of combinations of microinstructions. A series of microsteps constituting combinations of microinstructions is referred to as a microprogram. A memory supplied with said microprogram is referred to as a control memory.

With the above-mentioned microprogram control system, one word read out of the control memory is generally processed as a single microinstruction. Where, a parallel horizontal-type microinstruction system is applied in processing data, then the drawbacks arise that a microinstruction will have a larger number of bits; consequently, the bits constituting the control memory will increase in number; and the control memory will become more expensive, as data have to be processed more in parallel in a microstep.

SUMMARY OF THE INVENTION

It is accordingly the object of this invention to provide a microprogram control system which improves the arrangement of a control memory for a horizontal-type microinstruction system, thereby preventing said memory from becoming expensive.

Where a horizontal-type microinstruction system of processing data in parallel is applied for higher performance, then some of the respective fields or bit blocks of a microinstruction are supposed to be used less frequently than when data is not processed in parallel.

According to this invention, the fields of a microinstruction are divided into usually necessary (frequently used) and usually unnecessary (not frequently used) groups. The usually necessary fields are always stored in a first or main control memory and usually unnecessary fields are stored in a second or sub-control memory. Usually, the usually necessary fields of a microinstruction are read out of the first control memory. Where data thus read out includes an instruction to use the second control memory, then the fields of a microinstruction stored in both the first and second control memories are jointly read out, thereby making it possible to execute a microinstruction constituted by a variable number of bits.

BRIEF DESCRIPTION OF THE DRAWINGS

FIG. 1 is a block circuit diagram showing a microprogram control system embodying this invention;

FIG. 2A indicates an arrangement of a main control memory used with the invention;

FIG. 2B indicates an arrangement of a sub-control memory used with the invention;

DETAILED DESCRIPTION OF THE INVENTION

Figure 3:
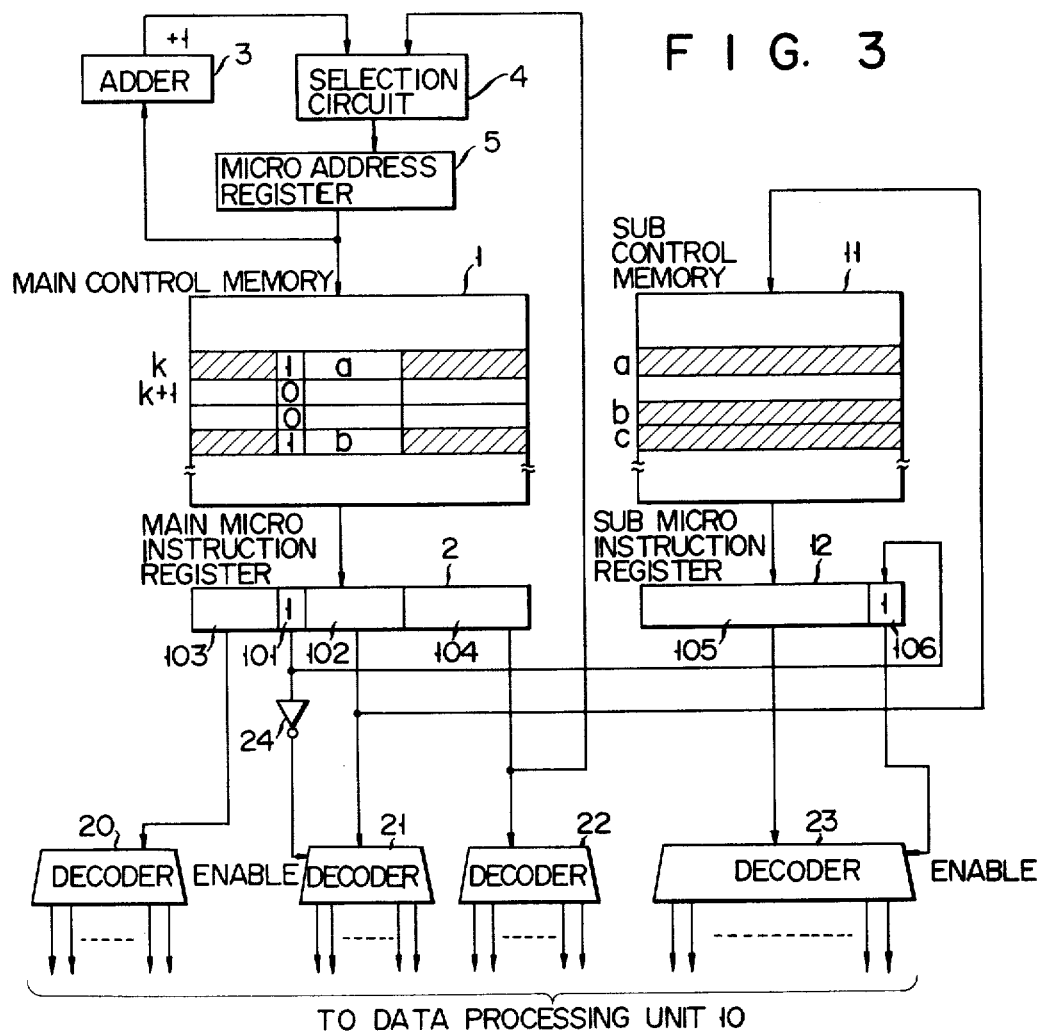
FIG. 3 is an example of detailed block circuit diagram of FIG. 1.

Referring to FIG. 1, a first control memory (hereinafter referred to as a main control memory) 1 is accessed according to the contents of an address register 5. A microinstruction read out of the main control memory 1 is stored in a main microinstruction register 2. Referential number 10 denotes a data-processing unit controlled by a microinstruction. The microinstruction stored in the main microinstruction register 2 specifies a particular register in the data-processing unit 10, and the contents of the thus specified register are delivered to a data-transmitting bus. Data transferred through said data bus is processed in an arithmetic operation circuit provided in the data-processing unit 10. The result of said arithmetic operation passes through another data bus to be stored in a particular one of the plural registers in the data-processing unit 10. A microinstruction is generally read out sequentially in address by adding +1 to the contents of an address register 5 in an adder 3 to be again stored in said address register 5 through a selection circuit 4. The sequence of a microprogram is branched off by storing the contents of a particular one of the fields of the main microinstruction register 2 in the address register 5 through the selection circuit 4.

Referential number 11 is a second control memory (hereinafter referred to as a sub-control memory). Referential number 12 denotes a sub-microinstruction register supplied with data readout of the sub-control memory 11. The sub-control memory 11 is accessed by address specified by one of the fields of a microinstruction stored in the main microinstruction register 2. Data thus read out is conducted to the sub-microinstruction register 12, an output from which is supplied to the data-processing unit 10 like an output from the main microinstruction register 2. One of the fields of a microinstruction stored in the main microinstruction register 2 includes data instructing the execution of a microinstruction read out of the sub-control memory 11. A sub-microinstruction is executed only when said instruction to use the sub-control memory is detected.

FIGS. 2A and 2B show the manner in which a microinstruction is stored in the main control memory 1 and sub-control memory 11 of FIG. 1 respectively. A main microinstruction shown in FIG. 2A is formed of a bit 101 instructing the use of the sub-control memory 11, a field 102 specifying one of the addresses of the sub-control memory 11 of FIG. 2B, and ordinary control fields 103, 104. Where the bit 101 instructing the use of the sub-control memory 11 is detected to have a binary code of "1," then the whole field 105 of the sub-control memory 11 shown in FIG. 2B is read out upon address designation by the field 102 to be stored in the sub-microinstruction register 12. Where said bit 101 is represented by a binary code "0," then the field 102 may be applicable as an ordinary control field.

Now, the operation of this invention will be briefly described by referring to FIG. 1, FIG. 2A and FIG. 2B. Where a microinstruction stored in an address k (FIG. 2A) is read out then said microinstruction is conducted to the main microinstruction register 2. At this time, the bit 101 of the microinstruction of the address k which instructs the use of the sub-control memory 11 is detected to have a binary code "1." The fields 103, 104 of the microinstruction read out from the address k are sent forth to the data-processing unit 10. The operation of the data-processing unit 10 is properly controlled by the control fields 103, 104 of a microinstruction of the address k shown in FIG. 2A read out of the main control memory 1.

Later, when an address "a" of the sub-control memory 11 of FIG. 2B is read out by the "a" represented by the field 102, the addresses of said sub-control memory 11 set in the main microinstruction register, then the resultant microinstruction is stored in the sub-microinstruction register 12 of FIG. 1. The succeeding main microinstruction is read out of the main control memory 1 at the same time as the reading of a sub-microinstruction from the sub-control memory 11. The succeeding main microinstruction is read out of the main control memory 1 by the following process for example: The address number of the succeeding main microinstruction is designated as k+1 by adding +1 to the preceding address number k in, for example, the adder 3. Address number k+1 is stored in the address register 5 through the selection circuit 4.

The contents of a microinstruction read out of the address k+1 of FIG. 2A to the main microinstruction register 2, and the contents of a microinstruction read out of the address k, as has been described, to the sub-microinstruction register 12 are jointly delivered to the data-processing unit 10 of FIG. 1 in the form of a composite microinstruction to control the operation of said data-processing unit 10.

A sub-microinstruction read out to the sub-microinstruction register 12 is activated only when the bit position 101 of the preceeding main microinstruction read out from the main control memory 2 is detected to have a binary code "1" instructing the use of the sub-control memory 11. This is implemented in the following manner: The sub-microinstruction register 12 is extended one bit position; the extended bit position is supplied with a micro-instruction data read out of the main memory 1; the output from the extended bit position enables or disables the sub-microinstruction from being sent forth to the data-processing unit in accordance with whether the extended bit position contains a binary code "1" or "0".

The another implementation is as follows: Where the data of the above-mentioned bit position 101 is represented by a binary code "0," then the sub-microinstruction register 12 can be reset instead of supplying of an output from the sub-control memory 11 to said sub-microinstruction register 12. Thus, the sub-control memory may be applied in any desired manner.

FIG. 3 is a detailed block circuit diagram showing the arrangements of FIGS. 1, 2A and 2B. The parts of FIG. 3 the same as those of FIGS. 1, 2A and 2B are denoted by the same referential Number, description thereof being omitted. The block diagram of FIG. 3 further indicates decoders 20, 21, 22, 23 and an inverter 24. The decoders 20, 21, 22 decode outputs from the main microinstruction register 2 and send forth the decoded outputs to the data-processing unit 10. The decoder 23 decodes an output from the sub-microinstruction register 12 and supplies the decoded output to the data-processing unit 10. These decoders are provided only for the sake of easiness of the description. At the time of circuit designing, however, these decoders may be combined with another control circuit to form a combination circuit. Provision of the above-mentioned decoders 20, 21, 22, 23 is a customary practice in a microprogram control system, further description being omitted. The inverter 24 is supplied with a bit output from the main microinstruction register 2 which instructs the use of the sub-control memory 11. An output inverted by the inverter 24 enables the decoder 21 or the output thereof.

There will now be described the operation of the inverter 24. Referential numerals 103, 101, 102, 104, given to the respective sections of the main microinstruction register 2 of FIG. 3 refer to those fields or bit positions of said register 2 in which there are stored data of the corresponding fields 103, 101, 102, 104 of a microinstruction stored in the main control memory 1. In the same sense, referential numeral 105 designating the sub-microinstruction register 12 indicates that the whole field 105 of the sub-control memory 11 of FIG. 2B is stored in said sub-microinstruction register 12.

There will now be described the operation of the micro-program control system of FIG. 3. The contents of an address whose number is stored in the microaddress register 5 are read out of the main control memory 1 to the main microinstruction register 2. Where the microinstruction thus read out is of the ordinary type, then data stored in the bit positions 103, 104 of the main microinstruction register 2 are decoded by the decoders 20, 22, and transferred to the data-processing unit 10. At this time, the bit position 101 of the main microinstruction register 2 is supplied with data represented by a binary code "0." An output inverted by the inverter 24 enables the decoder 21. Data stored in the bit position 102 of the main microinstruction register 2 is decoded by the decoder 21, and then transferred to the data-processing unit 10. Where the data of the field 101 instructing the use of the sub-control memory 11 is represented by a binary code "0," then a microinstruction stored in the main control memory 1 is formed of a plurality of fields 103, 102, 104.

The data of the field 102 of a microinstruction stored in the main microinstruction register 2 is used as an address data for the sub-control memory 11. According to the address indicated by the data of the field 102, data is read out of the sub-control memory 11 at the same time as when the succeeding address is read out of the main control memory 1. Data read out of the sub-control memory to the sub-microinstruction register 12 is not decoded by the decoder 23. Following is the reason. The sub-microinstruction 12 further comprises a bit position 106, in which the data of the field 101 of the main microinstruction register 2 is stored. An output from said bit position 106 enables the decoder 23 or the output thereof. This decoder 23 is not operated, so long as data represented by a binary code "0" is stored in the bit position 101 of the main microinstruction register 2 which is supplied with a microinstruction read out of the main control memory 1. Unless the bit position 101 of the main microinstruction register 2 is supplied with data of a binary code "1" instructing the use of the sub-control memory 11, a microinstruction read out therefrom is not executed.

Where data of a binary code "1" is stored in the bit position 101 of the main microinstruction register 2, the microinstruction read out of the sub-control memory 11 is enabled. For example, where the address k is stored in the microaddress register 5, then the contents of the address k of the main control memory 1 is read out to the main microinstruction register 2. Data stored in the bit positions 103, 104 of the main microinstruction register 2 are decoded by the decoders 20, 22 respectively. Decoded outputs from the decoders 20, 22 are sent forth to the data-processing unit 10. Since, however, data of a binary code "1" is stored in the bit position 101 of the main microinstruction register 2, the decoder 21 or the output thereof is prevented from being enabled by an inverted output from the inverter 24. As the result, data stored in the bit position 102 of the main microinstruction register 2 is not decoded by the decoder 21, nor is a control signal line connected to the data-processing unit 10 enabled.

Data "a" stored in the bit field 102 of the main microinstruction register 2 is used as an address data for the sub-control memory 11. Therefore, the contents of the address "a" of the sub-control memory 11 are read out to the sub-microinstruction register 12. At this time, the contents of the succeeding address (for example, K+1) are read out of the main control memory 1. As previously mentioned, the bit position 106 of the sub-microinstruction register 12 is supplied with the data of the bit position 101 of the main microinstruction register 2. An output from the bit position 106 of the sub-microinstruction register 12 enables the decoder 23 or the output thereof. Accordingly, the contents of the address "a" of the sub-control memory 11 read out to the sub-microinstruction register 12 are decoded by the decoder 23 and transferred to the data-processing unit 10. At this time, the contents of the address k+1 of the main control memory 1 are decoded by the decoders 20, 21, 22 and transferred to the data-processing unit 10. In this case it is assumed that the contents of the address k+1 read out to the main microinstruction register 2 indicate that the bit position 101 thereof which is designed to instruct the use of the sub-control memory 11 is stored with "0" data, hence the decoder 21 is actuated. Where, therefore, a microinstruction read out of the main control memory 1 includes a "1" bit 101 instructing the use of the sub-control memory, then the succeeding microinstruction is executed in the form of a large bit length comprising data read out of the main control memory 1 and data read out of the sub-control memory 11.

Figure 4:
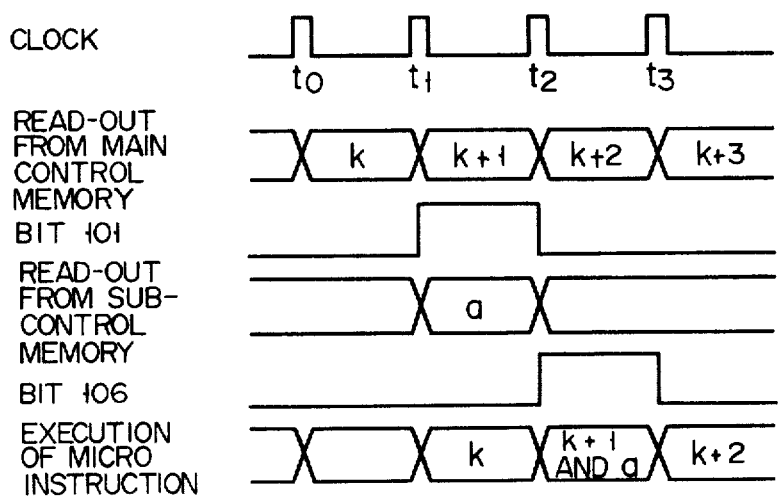
FIG. 4 is a time chart showing the manner in which the circuit of FIG. 3 is operated.

FIG. 4 is a timing chart showing the manner in which data is read out of the main control memory 1 and sub-control memory 11 and the step of executing a microinstruction in the data-processing unit 10. Referring to FIG. 4, a microinstruction stored in the address "k" of the main control memory 1 is read out at time to and is set in the microinstruction register 2 at time t1. At the succeeding time t2, there are read out the contents of the address "k+" of the main control memory 1 and the contents of the address "a" of the sub-control memory 11 which has been designated by the microinstruction of the address K and then set in the microinstruction registers 2, 12, respectively. At this time, the microinstruction of the address k read out of the main control memory 1 is executed in the data-processing unit 10. At the following time t3, the microinstruction of the address k+2 of the main control memory 1 is read out. At said time t3, a composite microinstruction formed of the contents of the address k+1 read out of the main control memory 1 and the contents of the address "a" read out of the sub-control memory 11 is executed in the data-processing unit 10.

As described above, this invention provides a microprogram control system which enables a microinstruction read out of the main control memory 1 and a microinstruction of large bit length read out of both main control memory 1 and sub-control memory 11 to be executed in any desired combination. Therefore, this invention admits of the manufacture of a microprogram control system with high versatility and at low cost. Though the foregoing embodiment included only a second or sub-control memory, it is obviously possible to use a plurality of sub-control memories.

As described above, this invention allows a sub-control memory to have any capacity adapted for the object intended, and enables a microinstruction of considerably large bit length to be executed economically and efficiently by properly devising the arrangement of the respective fields of a microinstruction.

What is claimed is:

1. A microprogram control system for assembling a sequence or variable length microinstructions to be executed by a data processing unit, said system comprising:

a main control memory having a plurality of addressable memory locations for storing microprograms, each said microprogram being constituted by a sequence of main microinstructions, each said main microinstruction comprising control data indluding an address field and a control bit, said control bit having either a first value or a second value;

means for transferring main microinstructions from said main control memory to said data processing unit for execution thereby, said main microinstruction transferring means including:

means for addressing said main microinstructions stored in said memory locations in said main control memory;

a main microinstruction register for receiving and for storing an addressed main microinstruction;

means for transmitting said addressed main microinstructions to said main microinstruction register; and main decoders for decoding said main microinstructions having said control bits of either said first or said second value stored in said main microinstruction register and for supplying said decoded main microinstructions to said data processing unit;

a sub-control memory for storing sub-microinstructions addressable by said address field of said control data contained in said main microinstructions;

means for transferring sub-microinstructions from said sub-control memory to said data processing unit, said sub-microinstruction transferring means comprising:

means for addressing a sub-microinstruction stored in said sub-control memory in accordance with an address constituted by said address field of a main microinstruction stored in said main microinstruction register;

a sub-microinstruction register for receiving and for storing said addressed sub-microinstructions;

means for transmitting addressed sub-microinstructions from said sub-control memory to said sub-microinstruction register; and a sub-decoder for decoding a said sub-microinstruction stored in said sub-microinstruction register responsive to a said control bit of a said main microinstruction stored in said main microinstruction register having said second value, and for supplying said decoded sub-microinstruction to said data processing unit concatenated with the said decoded main microinstruction supplied by said main decoders to said data processing unit.

2. A microprogram control system according to claim 1 wherein said sequence of main microinstructions includes kth and kth+1 main microinstructions and wherein when said kth main microinstruction is stored in said main microinstruction register and the control bit of said kth main microinstruction has said second value, (1) said kth main microinstruction is addressed, decoded, and transferred to said data processing unit by said main microinstruction transferring means, (2) said kth+1 main microinstruction is addressed, decoded and transferred to said data processing unit by said main microinstruction transferring means, and (3) a sub-control microinstruction indicated by said address field of said kth main microinstruction is addressed, decoded, and transferred to said data processing unit by said sub-microinstruction transferring means simultaneously with said transfer of said decoded kth+1 main microinstruction to said data processing unit by said main microinstruction transferring means.

3. A microprogram control system according to claim 2 wherein the number of bits simultaneously transferred from said main decoders and said sub-decoder responsive to said control bit of said kth main microinstruction having said second value is greater than the number of bits transferred from said main decoders to said data processing unit responsive to said control bit of said kth main microinstruction having said first value.

4. A microprogram control system according to claim 1 further including means for inhibiting the addressing, decoding, and transfer of a sub-microinstruction to said data processing unit by said sub-microinstruction transferring means when said control bit of said main microinstruction stored in said main microinstruction register has said first value.

5. The microprogram control system according to claim 4 further including means for preventing the decoding and transfer to said data processing unit by said main microinstruction transferring means of said address field of a said main microinstruction stored in said main microinstruction register when said control bit of said main microinstruction stored in said main microinstruction register has said second value.

* * * * *